(12) United States Patent
Giorda

(10) Patent No.: US 7,195,430 B2
(45) Date of Patent: Mar. 27, 2007

(54) HORIZONTAL BORING MACHINE TOOL

(75) Inventor: Claudio Giorda, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 338 days.

(21) Appl. No.: 10/667,363

(22) Filed: Sep. 23, 2003

(65) Prior Publication Data
US 2004/0136794 A1  Jul. 15, 2004

(30) Foreign Application Priority Data
Sep. 25, 2002  (IT) ............................ TO2002A0840

(51) Int. Cl.
*B23B 41/12* (2006.01)
(52) U.S. Cl. ........................ 408/156; 408/708; 82/1.2
(58) Field of Classification Search ................ 408/708, 408/153, 156, 154, 159, 54, 173; 82/1.2, 82/1.4, 1.5; *B23B 41/12*
See application file for complete search history.

(56) References Cited

U.S. PATENT DOCUMENTS

| 3,530,745 | A | * | 9/1970 | Mikewski ................... 408/158 |
| 4,224,846 | A | * | 9/1980 | Eysel et al. .................. 82/158 |
| 4,416,569 | A | * | 11/1983 | Yamakage et al. ............. 408/4 |
| 5,427,480 | A | * | 6/1995 | Stephens ..................... 408/168 |
| 6,012,880 | A | * | 1/2000 | Horn et al. .................. 408/156 |
| 6,247,878 | B1 | * | 6/2001 | Musil et al. ................. 408/1 R |
| 6,270,295 | B1 | * | 8/2001 | Hyatt et al. ................. 408/1 R |
| 6,315,503 | B1 | * | 11/2001 | Oswald et al. ............... 408/1 R |
| 6,343,899 | B1 |  | 2/2002 | Straub et al. |
| 6,536,998 | B2 | * | 3/2003 | Hyatt et al. ................. 408/147 |
| 6,729,810 | B2 | * | 5/2004 | Hyatt et al. ................. 408/1 R |
| 6,752,571 | B2 | * | 6/2004 | Oswald et al. ............... 408/173 |
| 6,846,136 | B2 | * | 1/2005 | Brock et al. ................. 408/154 |

FOREIGN PATENT DOCUMENTS

| EP | 0 968 069 B1 | 8/2001 |
| EP | 1 262 263 A1 | 12/2002 |

\* cited by examiner

*Primary Examiner*—Monica Carter
*Assistant Examiner*—Sara Addisu
(74) *Attorney, Agent, or Firm*—Sughrue Mion, PLLC

(57) ABSTRACT

A horizontal boring machine tool is described that includes a boring bar equipped with a cutting bit and a counter-bar coupled in head-to-head rotation with the boring bar. This counter-bar is also equipped with a cutting bit, or a series of cutting bits destined to operate simultaneously on the same cylindrical seat to be bored. Both the bit or bits arranged on the bar, and the bit or bits arranged on the counter-bar are radially adjustable via an automatic adjustment system.

4 Claims, 3 Drawing Sheets

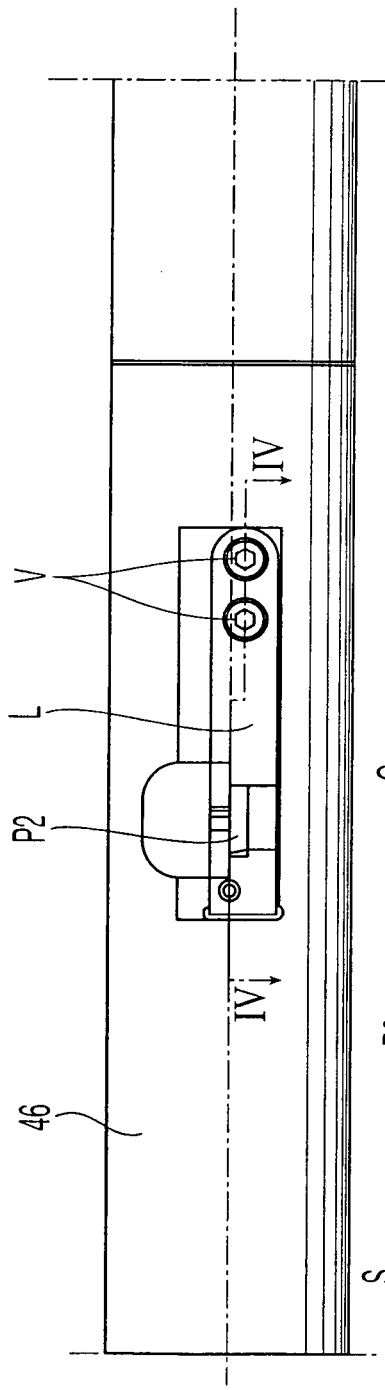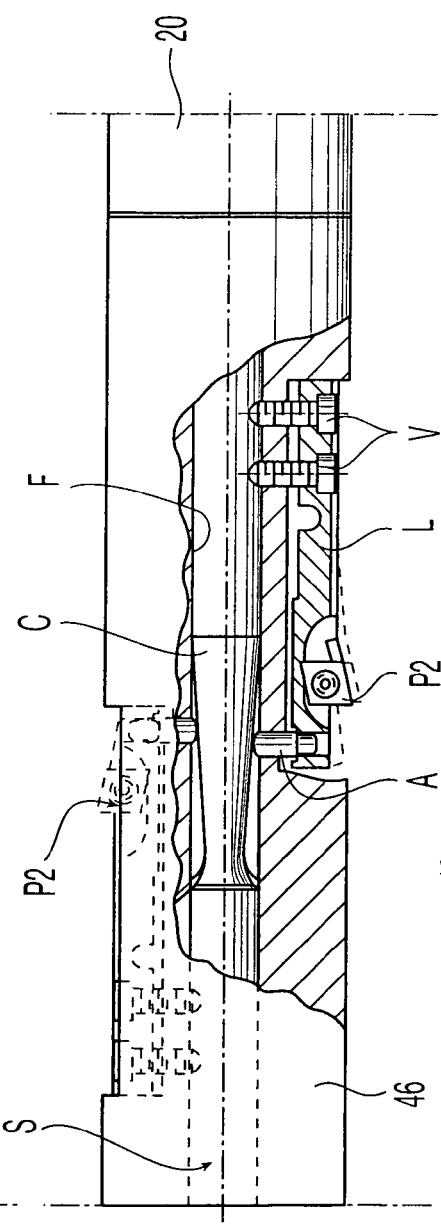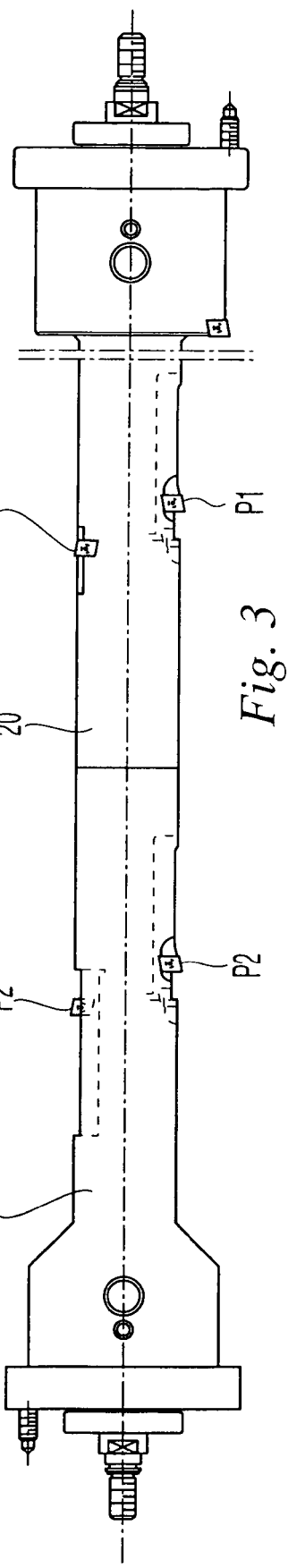

HORIZONTAL BORING MACHINE TOOL

BACKGROUND OF THE INVENTION

The present invention relates to horizontal boring machines for boring cylindrical surfaces having horizontal axes and axially separated from each other, such as the seats of an engine crankshaft in the crankcase of an internal combustion engine.

In particular, the invention refers to horizontal boring machines of the type including a boring bar driven in rotation by a chuck and carrying at least one cutting bit, during means for driving rotation of said chuck, means for axially moving the group composed of the chuck and the associated driving means, a counter-bar coupled in rotation head-to-head with said boring bar and driven in rotation by a respective auxiliary chuck, driving means for driving rotation of the auxiliary chuck in synchronism with the rotation of the boring bar, and means for axially moving the group composed of said counter-bar and said driving means for driving rotation of the counter-bar in synchronism with the axial movement of the boring bar, said boring bar being provided with a device for adjusting the radial position of said at least one cutting bit that is associated therewith.

A boring machine of the above-specified type is described and illustrated in U.S. Pat. No. 6,343,899 B1 and in the corresponding EP 0 968 069 B1.

FIG. 1 of the enclosed drawings is a reproduction of FIG. 2 of the above-identified U.S. patent. In this figure, reference number 2 indicates the crankcase of an internal combustion engine carrying five cylindrical seats, axially spaced apart from each other and which are to define the seats for the engine crankshaft. The mechanical machining of these seats is carried out using the machine tool, generally indicated by reference number 1 in FIG. 1, which includes a bed 6 with a worktable 8 on which the crankcase 2 is fixed. The boring work on these seats is performed using a boring bar 20, carrying at least one radially adjustable cutting bit (not visible in FIG. 1), which is driven in rotation by a chuck 24, in turn driven by a motor 32 via a transmission 34. The entire group composed of the boring bar 20, the associated chuck 24 and the associated motor 32 is carried on a slide 18 that can move axially on guides 17 using a screw system controlled by a motor 22. On the group carried by the slide 18, a motor 38 is also mounted for driving, via a transmission 40, the axial movement of a shaft 36 inside the boring bar 20, for the purpose of providing the radial adjustment of the cutting bit carried by the bar 20. The motor 32 is typically an electric motor.

The end of the boring bar 20 is coupled in rotation, head to head, with the end of a counter-bar 46 that is driven in rotation by a chuck 42, in turn driven by an electric motor 50, which is slave to the motor 32 to ensure the control of synchronous rotation for the boring bar 20 and the counter-bar 46. A transmission 52 connects the motor 50 to the chuck 42. The entire group composed of the counter-bar 46, the chuck 42 and the motor 50 is carried on a slide 20a that can move axially on guides 16 via a screw system controlled by a motor 22.

At the start of the machining operation, the boring bar 20 and the counter-bar 46 are made to penetrate inside the crankcase 2 from opposite sides until their ends reciprocally engage. When this operation is complete, the group composed of the boring bar 20 and the counter-bar 46 is moved at intervals in the axial direction via the synchronous control of the two slides 18 and 20a, so as to bring, in successive phases, the cutting bit of the boring bar 20 into correspondence with each of the crankshaft seats of the crankcase 2. Each time that the cutting bit 50 is positioned in correspondence with a seat, the synchronous rotation of the boring bar 20 and the counter-bar 46 is activated, together with a progressive axial feed movement to perform the boring of that specific seat. Before and after the machining of each seat, the cutting bit carried by the boring bar 20 is radially withdrawn, via an adjustment system controlled by the motor 38, to allow the new axial positioning of the group without creating interference between the cutting bit and the machined surface or the new surface to be machined. Once the group has been positioned to set up the cutting bit in correspondence with a new seat to be machined, the bit is again radially moved to its operational position, to permit machining. The radial adjustment of the bit is also used for compensating for wear on the bit.

The main drawback of the above-described machine is that it necessitates machining the seats one at a time, which implies a relatively high cycle time. On the other hand, an arrangement with multiple cutting bits axially spaced apart from each other on the boring bar is unthinkable, as in this case it would be impossible in practice to make an automatic radial adjustment system for all of the cutting bits carried by the boring bar.

SUMMARY OF THE INVENTION

The object of this invention is that of providing a machine of the type indicated at the beginning that is capable of reducing the machining cycle time for a number of cylindrical seats axially spaced apart from each other and, nevertheless, always permits radial adjustment of the cutting bit to be automatically performed, and which still has a relatively simple and low-cost structure.

In order to achieve this object, the invention provides a horizontal boring machine having the characteristics indicated at the beginning of this description and characterized in that said counter-bar is also equipped with at least one cutting bit, whereby it constitutes an auxiliary boring bar and is provided with means for radial adjustment of the this cutting bit.

Due to this feature, the duration of the machining cycle is more or less halved with respect to the known machine, because the two cutting bits carried by the boring bar and the counter-bar respectively are capable of performing the simultaneous machining of two cylindrical seats. In addition, because each of the two bars includes only one cutting bit, or just a single series of cutting bits, which are always to operate on the same surface to be bored, each bit can still be provided with means for automatic adjustment in the radial direction of the bit itself, without any particular constructional complication.

BRIEF DESCRIPTION OF THE DRAWINGS

Additional characteristics and advantages of the invention will become clear from the description that follows with reference to the enclosed drawings, supplied purely by way of a non-limitative example, where:

FIG. 3 is a partial side view of the two boring bars forming part of the machine in accordance with the invention, FIG. 4 is an enlarged-scale view of a detail of a cutting bit of one of the two boring bars of the machine in accordance with the invention, e FIG. 5 is a section view along the line V—V of FIG. 4.

DETAILED DESCRIPTION OF THE INVENTION

Figure 1:
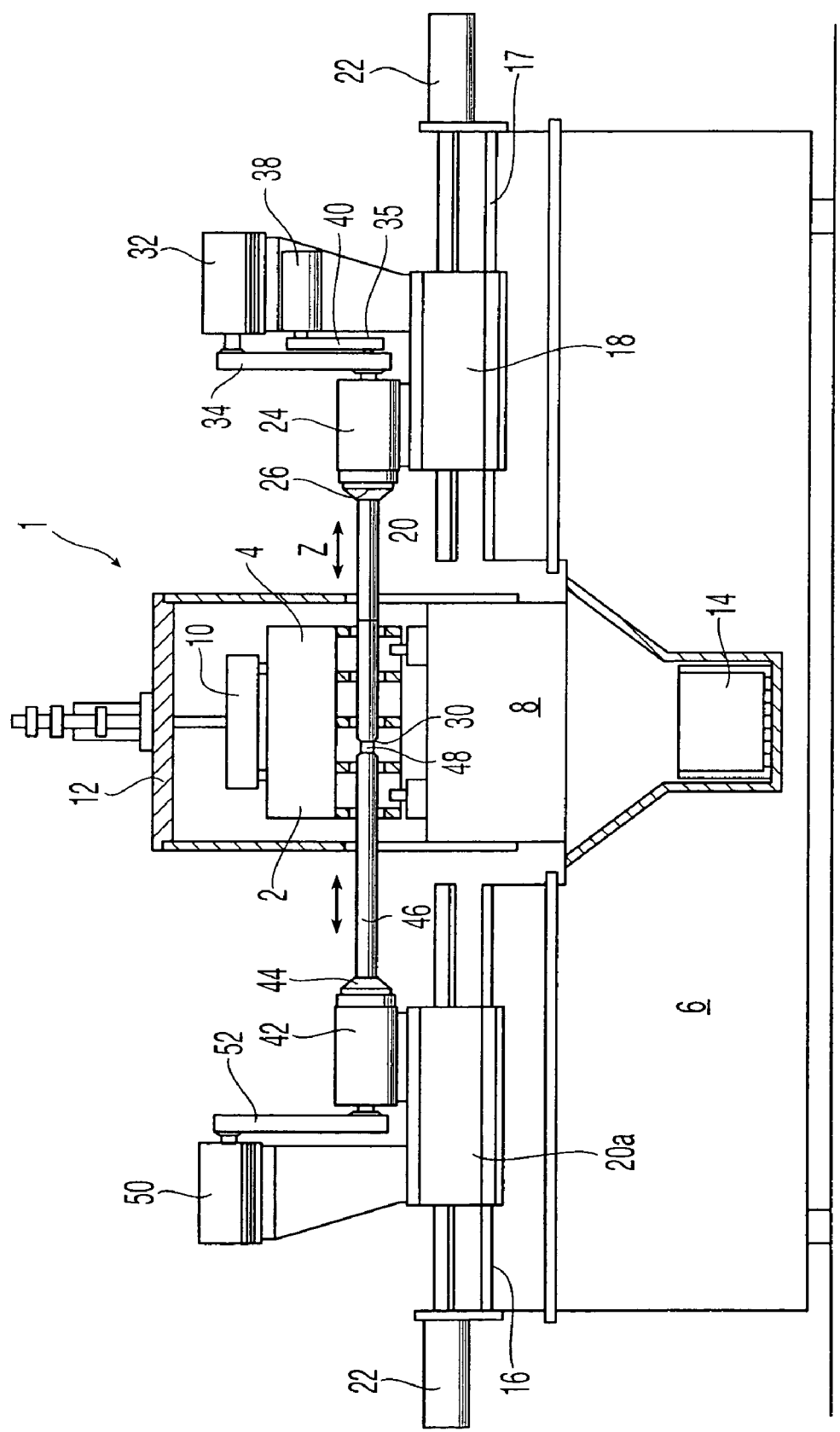
FIG. 1, as already indicated, refers to the prior art.
Figure 2:
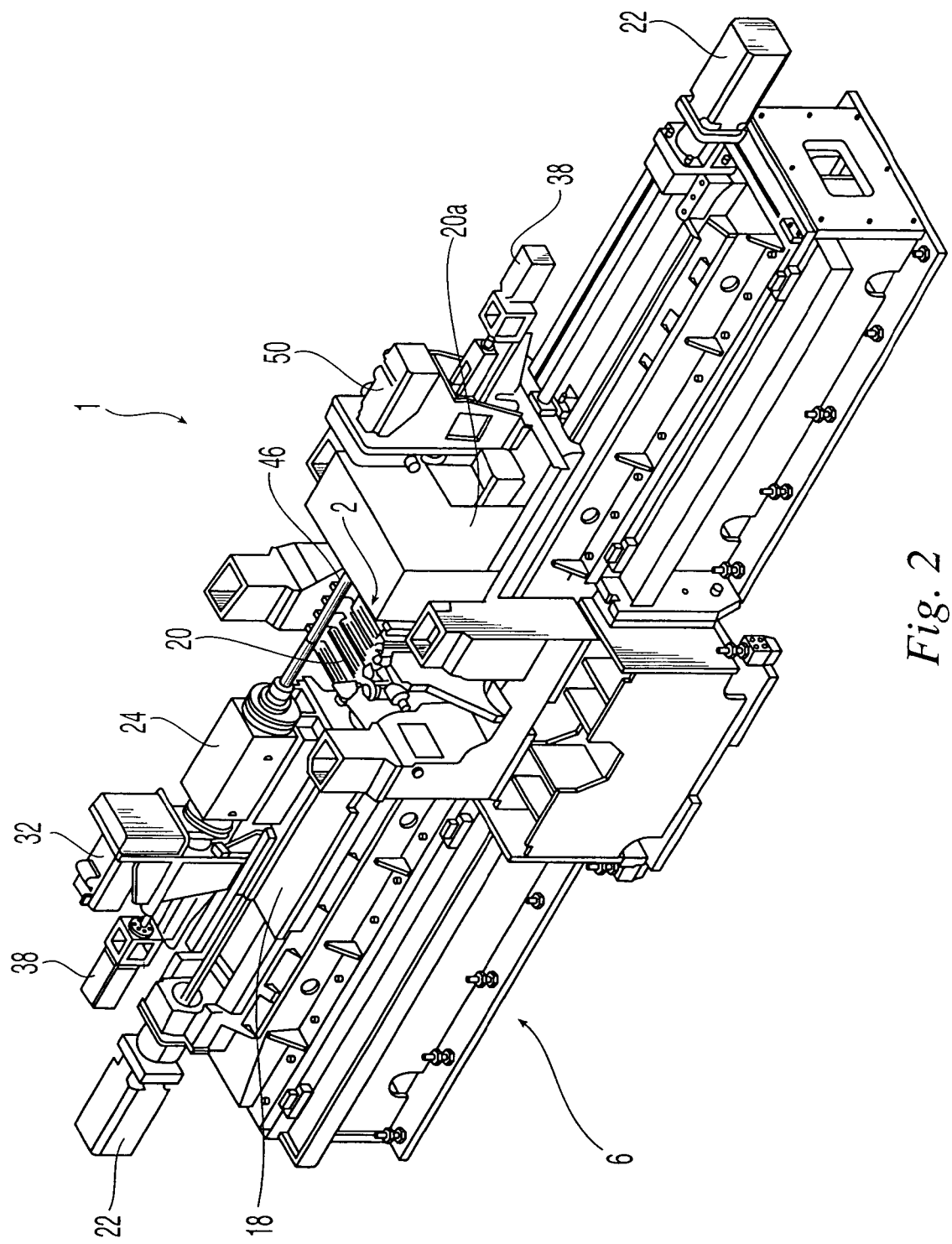
FIG. 2 is a diagrammatic perspective view of a machine in accordance with the invention.

In FIG. 2, the parts corresponding to those already described with reference to FIG. 1 are indicated using the same reference number. The general layout of the machine in FIG. 2 is similar to that in FIG. 1. The main difference resides in the fact that, as is clearly visible in FIG. 2, both the boring bar 20 and the counter-bar 46, which at this point also becomes a boring bar, are equipped with at least one cutting bit indicated as P1, P2. In the illustrated example, each bar is in reality equipped with a pair of diametrically opposed bits P1 and P2. The bits of each pair are to work on the same seat each time.

With reference to FIGS. 3–5, each of the cutting bits P1, P2 (FIGS. 4 and 5 refer to the case of the P2 bits) is carried by an elastically deformable blade L, fixed at one end to the respective bar by screws V. The two bars 20 and 46 are connected head-to-head in rotation using any type of coupling, such as a conical coupling (not visible in the drawings). Each blade L can be deflected outwardly following engagement of a radial pin A, which projects in an axial cylindrical cavity F on each bar, against a conical portion C of a shaft S that is mounted to slide inside the cavity F. As already stated, each of the two bars 20 and 46 has an axial cylindrical cavity F within which a respective shaft S is mounted such that it can slide, said shaft being axially movable via a screw drive controlled by a respective electric motor 38 (FIG. 2) that, in this case, is provided not just for the bar 20 (as in the case of known technology) but also for the counter-bar 46. An axial displacement of the shaft S causes the radial shift of the pin A between a position in which it projects inside the cavity F (illustrated in FIG. 5) to a position in which it is pushed outwards by the part of greater diameter on the conical portion C, thereby bringing the bit into its most extended radial position. Obviously, said automatic adjustment that is achieved via an axial movement of the shaft S can be exploited both for retracting the bits P1 and P2, when they must be axially moved to bring them into correspondence with a new seat to be machined, and for carrying out adjustment of the cutting bits' working position as they become worn.

Thanks to the above-described characteristics, the machine in accordance with the invention is capable of performing the boring of two cylindrical seats at a time, which permits a considerable reduction in the duration of the machining cycle with respect to the machine using known technology. At the same time, because each bar is equipped with only one cutting bit, or just a single series of cutting bits, destined to simultaneously operate on the same cylindrical seat to be bored, it is still possible to arrange an automatic adjustment system for the radial position of this bit or series of bits.

Naturally, the principle of the invention being understood, the constructional details and forms of embodiment could be extensively changed with respect to that described and illustrated by way of example without leaving the scope of the present invention.

What is claimed is:

1. A horizontal boring machine for boring cylindrical surfaces having horizontal axes and axially spaced apart from each other, such as the seats for an engine crankshaft in the crankcase of an internal combustion engine, including:
    a boring bar driven in rotation by a chuck and carrying a pair of diametrically opposed cutting bits, driving means for driving rotation of said chuck, means for axially moving the group composed of the chuck and the associated driving means, a counter-bar coupled in rotation head-to-head with said boring bar and driven in rotation by a respective auxiliary chuck, driving means for driving the rotation of the auxiliary chuck in synchronism with the rotation of the boring bar, means for axially moving the group composed of said counter-bar and the associated driving means, in synchronism with the axial movement of the boring bar, said boring bar being provided with a device for adjusting the radial position of said cutting bits that are associated therewith,
    wherein said counter-bar is also equipped with a pair of diametrically opposed cutting bits, whereby the counter-bar constitutes an auxiliary boring bar, and is provided with means for radial adjustment of the counter-bar cutting bits,
    wherein the pairs of diametrically opposed cutting bits work on the same cylindrical surface each time,
    wherein each cutting bit is carried near the free end of a blade, the opposite end of which is fixed to the body of the associated bar at axially spaced positions and are oriented toward each other with their bit-carrying ends, and which is elastically deformable outwards due to the effect of a radial pin carried by the free end of the blade engaging against a conical portion of a shaft sliding inside an axial cavity of said bar, and
    wherein the axially slideable conical portion causes adjustment of the radial positions of the two diametrically opposed cutting bits on each of said bar and said counter-bar.

2. A boring machine according to claim 1, wherein the cutting bits of each pair are axially staggered with respect to each other.

3. A method for boring cylindrical surfaces having horizontal axes and axially spaced apart from each other, such as the seats for an engine crankshaft in the crankcase of an internal combustion engine, in which:
    coupling a boring bar carrying diametrically opposed cutting bits and a counter-bar in rotation head-to-head with said boring bar for insertion through a series of surfaces to be machined, from opposite ends of said series of surfaces,
    simultaneously driving said boring bar and said counter-bar in synchronized rotation to perform the boring each of said surfaces via the cutting bits,
    during the rotation of the bars, the groups carrying said boring bar and said counter-bar are moved axially in a simultaneous and synchronized manner to perform the machining of each cylindrical surface,
    said boring bar being equipped with a device for adjusting the radial position of the one, or each, cutting bit that is associated with it,
    wherein the aforesaid counter-bar is also equipped with diametrically opposed cutting bits, whereby it constitutes an auxiliary boring bar that performs the boring of a surface different from the surface being worked by the cutting bits of the main boring bar and wherein each cutting bit is carried near the free end of a blade, the opposite end of which is fixed to the body of the associated bar at axially spaced positions and are oriented toward each other with their bit-carrying ends, and which is elastically deformable outwards due to the effect of a radial pin carried by the free end of the blade engaging against a conical portion of a shaft sliding inside an axial cavity of said bar.

4. A method according to claim 3, wherein said counter-bar is also equipped with means for radial adjustment of the cutting bits carried by the counter-bar.

* * * * *